Feb. 4, 1936.  E. R. DURGIN  2,029,470

NOSE PAD CONNECTION FOR EYEGLASS FRAMES

Filed April 24, 1934

INVENTOR
Edgar R. Durgin,
BY
George D. Richards
ATTORNEY

Patented Feb. 4, 1936

2,029,470

UNITED STATES PATENT OFFICE 2,029,470

NOSE PAD CONNECTION FOR EYEGLASS FRAMES

Edgar R. Durgin, Newark, N. J., assignor to New Jersey Optical Company, Newark, N. J., a corporation of New Jersey Application April 24, 1934, Serial No. 722,081

3 Claims. (Cl. 88—49)

This invention relates to improvements in eyeglass frames; and the invention has reference, more particularly, to an improved means for pivotally connecting nose pads to eyeglass frames.

This invention has for its principal object to provide a novel connection for pivotally supporting a nose pad in operative assembled relation to an eyeglass frame or front in such manner that the pad will quickly and easily adjust itself to the angular planes of the nose of the wearer when the eyeglasses are applied to the face of the latter and the pad brought in contact with the nose surface; and to this end the novel connection is so devised that the pad supported thereby will freely and easily rock in a vertical direction or plane with a minimum of lateral looseness or play so that a firm eyeglass supporting engagement with the wearer's nose is assured.

This invention has for a further object to provide a pivotal connection for nose pads of eyeglass frames which is mechanically simple, and wherein the cooperating parts may not only be easily and quickly manipulated to assemble the same in nose pad coupling relation to the frame during the initial manufacture of the frames, but may, with equal ease and facility, be manipulated by the retail optician for removal, repair and replacement.

Other objects of this invention, not at this time more particularly enumerated, will be understood from the following detailed description of the same.

Illustrative embodiments of the invention are shown in the accompanying drawing, in which:

Fig. 1 is a front elevation of an eyeglass frame or front equipped with the novel nose pad connections according to this invention; Fig. 2 is a detail sectional view, taken on line 2—2 in Fig. 1, but drawn on a considerably enlarged scale; Fig. 3 is a vertical section, taken on line 3—3 in Fig. 2; Fig. 4 is a transverse vertical section, taken on line 4—4 in Fig. 3; Fig. 5 is a fragmentary sectional view, similar to that of Fig. 3, but illustrating the method of manipulating the cooperating elements of the nose pad connection when assembling the same to couple the nose pad in pivotal relation to the eye-glass frame.

Similar characters of reference are employed in the above-described views, to indicate corresponding parts.

Figure 1:
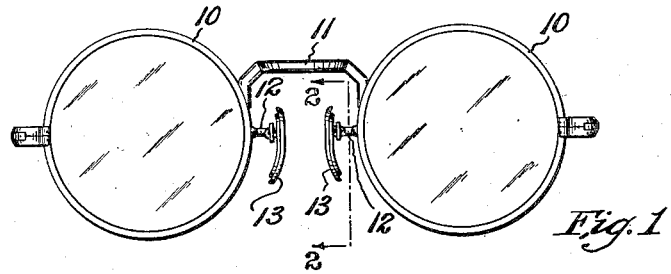

Referring to the drawing, the reference character 10 indicates the lens carrying rims of an eyeglass frame or front, the same being spaced apart and connected together by an intermediate bridge 11. Suitably affixed to the inner sides of the rims 10 below the bridge 11 are bowed arms 12 by which the nose pads 13 are supported.

The novel connection for detachably pivoting a nose pad 13 upon an arm 12, comprises a yoke frame carried by the free end of said arm, and knuckle forming means carried by the nose pad device.

In preferred form, the yoke frame is swaged from and as an integral part of the free end of the arm 12, and comprises spaced side bars 14 and 15 disposed transversely of the longitudinal axis of the arm 12, the same being interconnected intermediate their upper and lower ends by a fulcrum bar 16, which is preferably disposed in alignment with the longitudinal axis of said arm 12. Preferably, although not necessarily, the lower extremities of said side bars 14 and 15 are connected by a bottom bar 17, thus defining a slot-like opening 18 beneath the fulcrum bar 16 between the lower end portions of said side bars 14 and 15. The upper end portions of said side bars provide in conjunction with said fulcrum bar 16 an upwardly open yoke socket 19 above the latter.

Figures 2, 3, 4, 5:
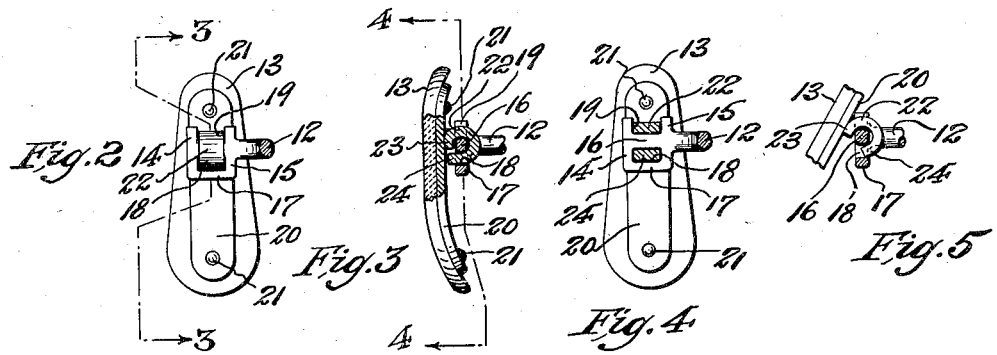

The nose pad 13 preferably comprises a suitably shaped body of non-metallic material, such as shell, pyroxylin, zylonite, cork or the like, the same being mounted upon a metallic backing plate 20 and suitably secured thereto, as by rivets 21. The knuckle forming means, in one form, comprises a transverse knuckle tongue 22, having one end 23 suitably secured to the rear face of the backing plate 20, and its other end constituting a free end portion 24. Preferably this knuckle tongue is initially bent into an open hook-like formation, as shown in Fig. 5. It will be understood that the nose pad per se may be made of metallic material, if desired, and that the knuckle tongue in such case may be secured directly to the rear face thereof.

To assemble the connection so as to thereby pivotally mount or couple the nose pad upon the arm 12, the free end portion 24 of the knuckle tongue 22 is hooked over the fulcrum bar 16 of the yoke frame thereby bringing the main body of the knuckle tongue down through the open top of the yoke socket 19 so as to engage the same therein and between the upper end portions of the side bars 14 and 15, and so that the extremity of the free end portion 24 is opposed to the opening 18 between the lower end portions of said side bars 14 and 15, all as shown in Fig. 5. After the knuckle tongue is thus related to the yoke frame, a pliers or other suitable tool is applied to the initially open knuckle tongue 22 to close the same around the fulcrum bar 16, so that the free end portion 24 passes beneath the latter and between the side bars 14 and 15, and then into closed up relation to the fixed end 23 substantially abutting the backing plate 20, as shown in Fig. 3.

When the connection is assembled, as above described, the nose pad will be so coupled to the end of the arm 12 as to be capable of endwise rocking about the fulcrum bar 16 whereby, when the eyeglasses are applied to the face of the wearer, the nose pad will quickly and easily assume an angular plane conforming to that of the surface of the wearer's nose with which it is brought in contact. Owing to the embracing support of the side bars 14 and 15 of the yoke frame, which abut the sides of the closed knuckle tongue, undue lateral play or wobbling of the nose pad is prevented, and consequently once the nose pads adjust themselves angularly to the wearer's nose, the same firmly and securely support the eyeglasses in proper relation to the wearer's eyes without tendency to vibration or looseness, thus eliminating all feeling of discomfort or insecurity.

Figures 6, 7, 8:
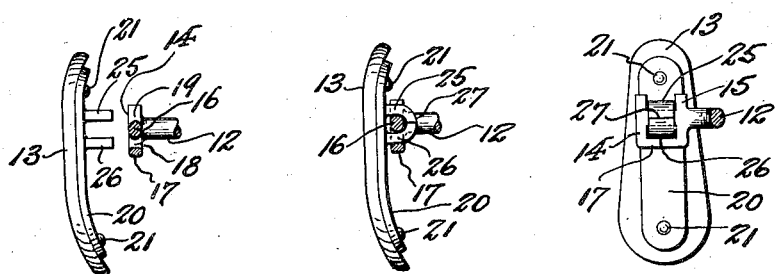
Fig. 6 is in part a side elevation and in part a sectional view of the cooperating parts of a somewhat modified form of connection means ready to be assembled in cooperating and nose pad supporting relation.
Fig. 7 is a similar view with the parts operatively assembled.
Fig. 8 is a rear face elevation of the assembly.
Figure 9:
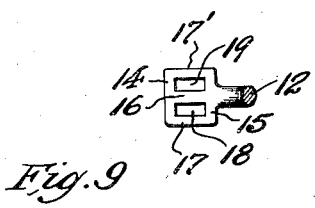
Fig. 9 shows a modified form of the yoke frame element of the connection.

Referring now to Figs. 6 to 8 inclusive, there is shown therein a modified form of knuckle forming means for cooperation with the yoke frame, the same comprising vertically spaced upper and lower knuckle tongues 25 and 26, which are suitably secured to the backing plate 20 to initially project rearwardly therefrom in parallel horizontal planes. In assembling this type of knuckle forming means with the yoke frame of the arm 12, the free ends of the knuckle tongues 25 and 26 are inserted between the side bars 14 and 15 to straddle the fulcrum bar 16, whereby the upper knuckle tongue 25 passes over the fulcrum bar 16 to lie within the yoke socket 19, and the lower knuckle tongue 26 passes beneath the fulcrum bar 16 to lie within the opening 18. When the knuckle tongues 25 and 26 are thus related to the fulcrum and side bars of the yoke frame, the free end portions thereof are engaged by a suitable tool and manipulated to bend the same around one toward the other until their extremities close together in abutting relation as at 27, see Figs. 7 and 8. When the knuckle tongues 25 and 26 are thus closed together, the same will form a pivoted knuckle embracing the fulcrum bar 16, and supported by the side bars 14 and 15 against undue lateral play, as and for the purposes already above described. In Fig. 9 there is shown a modification of the yoke frame, wherein the extremities of the upper end portions of the side bars 14 and 15 are shown connected by a top bar 17' to fully enclose the yoke socket 19. This form of yoke frame may be employed with either type of knuckle forming means above described, but is especially adapted for use with the modified type of knuckle forming means last above described.

It will be understood that changes, other than those herein mentioned, could be made in the above described constructions, and many apparently widely different embodiments of this invention could be made without departing from the scope thereof as defined in the appended claims. It is therefore intended that all matter contained in the above description or shown in the accompanying drawing shall be interpreted as illustrative and not in a limiting sense.

I claim:—

1. A nose pad connection for eyeglass frames, comprising an arm affixed to a lens rim of the frame, a pressed yoke frame integral with the free end of said arm, said yoke frame having a fulcrum bar extending substantially horizontally and aligned with the axis of said arm, a bottom bar extending parallel to said fulcrum bar and spaced downwardly therefrom, and laterally spaced vertical side bars transverse to said fulcrum bar and said bottom bar, a nose pad member, and a knuckle forming means transverse to the vertical axis of said nose pad member, said means comprising a knuckle tongue of a thickness substantially equal to the spacing of said fulcrum and bottom bars, said knuckle tongue having one end rigidly affixed to said nose pad member and its other end free, said tongue being bent around and pivotally engaged on said fulcrum bar and fitting snugly between said side bars and between said fulcrum and bottom bars with its free end in closed substantially abutting relation to its fixed end.

2. A nose pad connection for eyeglass frames, comprising an arm affixed to the eyeglass frame, a yoke frame formed integral with the free end of said arm, said yoke frame having a central substantially horizontally extending fulcrum bar of substantially circular cross section, said fulcrum bar being integral with and extending between the sides of said yoke frame, said yoke frame having a bottom bar and an opening between said fulcrum and said bottom bars and an upwardly open yoke socket above said fulcrum bar, and a nose-pad having knuckle forming means transverse to the vertical axis thereof, said means comprising a tongue bent conformably around said fulcrum bar, said tongue fitting snugly between the sides of said yoke frame, and between said fulcrum and bottom bars and engaged in said yoke socket and opening of said yoke frame to pivotally mount the nose pad for endwise tilting movement substantially free from lateral play.

3. A nose pad connection for eyeglass frames, comprising an arm affixed to the eyeglass frame, a yoke frame integral with the free end of said arm, said yoke frame having a central fulcrum bar of substantially circular cross-section in substantial alignment with the longitudinal axis of said arm, a bottom bar extending parallel to said fulcrum bar, said bars being formed integral with and extending between the sides of said yoke frame, said yoke frame having an opening between said fulcrum and bottom bars and an upwardly open yoke socket above said fulcrum bar, a nose pad member, and a knuckle forming means transverse to the vertical axis of said nose pad member, said means comprising a knuckle tongue having one end rigidly affixed to said nose pad member and its other end free, said tongue being engaged in said yoke socket and being bent conformably around said fulcrum bar with its free end portion engaged snugly through the yoke frame opening below said fulcrum bar and above said bottom bar and disposed in substantially abutting closed relation to the fixed end of said tongue.

EDGAR R. DURGIN.